United States Patent [19]
Gosser

[11] 3,853,754
[45] Dec. 10, 1974

[54] MEMBRANE SEPARATION OF HOMOGENEOUS CATALYSTS FROM NITRILE SOLUTIONS

[75] Inventor: Lawrence Wayne Gosser, Wilmington, Del.

[73] Assignee: E. I. du Pont de Nemours and Company, Wilmington, Del.

[22] Filed: July 20, 1972

[21] Appl. No.: 273,803

[52] U.S. Cl. .................................. 210/23, 260/464
[51] Int. Cl. ............................................ B01d 13/00
[58] Field of Search ....................... 210/23; 260/464

[56] References Cited
UNITED STATES PATENTS

| | | | |
|---|---|---|---|
| 2,913,507 | 11/1959 | Binning et al. .................... | 210/23 X |
| 3,228,876 | 1/1966 | Mahon ................................. | 210/22 |
| 3,567,632 | 3/1971 | Richter et al. ...................... | 210/23 |
| 3,617,553 | 11/1971 | Westaway et al. ................. | 210/23 |
| 3,645,891 | 2/1972 | Goldup et al. ................. | 210/500 X |
| 3,743,597 | 7/1973 | Credali ............................... | 210/23 |

FOREIGN PATENTS OR APPLICATIONS

| | | | |
|---|---|---|---|
| 1,266,810 | 3/1972 | Great Britain ...................... | 210/23 |
| 1,212,758 | 11/1970 | Great Britain ...................... | 210/23 |

*Primary Examiner*—Samih N. Zaharna
*Assistant Examiner*—Richard Barnes

[57] ABSTRACT

Asymmetric aromatic polyamide and aromatic polyimide membranes are used in the reverse osmosis separation of a metalorgano complex catalyst from an organic solution containing a mixture of such catalyst and an organic nitrile having up to 12 carbon atoms.

12 Claims, 3 Drawing Figures

MEMBRANE SEPARATION OF HOMOGENEOUS CATALYSTS FROM NITRILE SOLUTIONS

BACKGROUND OF THE INVENTION

1. Field of the Invention

This invention is concerned with a reverse osmosis process for concentrating selected metal complex catalysts in solution in an organic nitrile.

2. Description of the Prior Art

Polymeric membranes have frequently been used for the reverse osmosis separation of aqueous solutions. Cellulose acetate membranes have long been preferred, but commonly assigned U.S. Pat. No. 3,567,632, issued to Richter and Hoehn discloses that sustained high values for water flux and salt rejection can be obtained by proper selection of structure and hydrophilicity in certain nitrogen-linked polymeric membranes. Similarly British Pat. No. 1,212,758 and South African Patent Application 68/5860, filed Sept. 3, 1968, teach a method of preparing asymmetric membranes that show increased water flux while retaining water-soluble macromolecules such as dextran.

In applying reverse osmosis to the problem of separating dissolved catalysts from an organic liquid, Binning patent, U.S. Pat. No. 2,913,507, teaches that a number of hydrophobic membranes can be used to permeate oil-soluble organic chemicals such as hydrocarbons while rejecting acidic catalysts such as strong mineral acids and metal halides such as $BF_3$. A subsequent Binning patent, U.S. Pat. No. 3,230,245, discloses that alkyl borates are rejected while alcohols are permeated through a plastic membrane having preferential solubility for the alcohol, particularly a membrane formed from a cellulose derivative. According to the disclosures of U.S. Pat. No. 3,617,533, Belgian Pat. No. 740,956, and Dutch patent application No. 70/08849, alcohols, aldehydes and hydrocarbons are permeated through cellulosic, silicone rubber or polyolefin membranes to separate them from complex catalysts of the transition metals. These membranes are not entirely suitable for use with many organic solvents because they may distort under operating pressure and because they are subject to chemical attack, swelling badly or cracking under the influence of strong solvents such as the organic nitriles.

Metal-organo complex catalysts are used in various processes such as hydrocyanating, isomerizing, dimerizing, hydrogenating and coupling of unsaturated organic nitriles as described for example in U.S. patents

| | | |
|---|---|---|
| 3,496,210 | 3,496,218 | 3,542,847 |
| 3,496,215 | 3,536,748 | 3,579,560 |
| 3,496,217 | 3,538,142 | 3,595,901 | and in commonly assigned application filed Aug. 2, 1971 in the name of King, Seidel and Tolman, Ser. No. 168,352 now U.S. Pat. No. 3,798,256. The catalysts used are generally organic complexes of the transition metals Ni, Pd, Pt, Co, Rh and Ru. Various promoters, particularly aryl boron compounds such as triphenylboron can be present to increase the catalyst efficiency. Such processes for large scale production of commercial items such as adiponitrile require efficient separation and recycling of the expensive catalyst and promoter compositions. Separation of the catalysts and promoters from the nitrile-containing solutions is especially difficult because of the strong affinity of the catalyst and promoter metals for the nitrile group. Thus, the platinum group metals Ni, Pd and Pt have a marked tendency to form strong complexes with nitrile-containing ligands. It happens that the preferred promoter metal, boron, also coordinates with organic nitriles to form complexes of the type $BR_3.R'CN$. Because many of the catalysts are deactivated by heat, their separation by distillation is impractical. Chemical separation schemes have generally been uneconomical, and as a result separation difficulties have prevented full utilization of the most effective catalysts for nitrile processes.

DESCRIPTION OF THE INVENTION

The present invention is a process for the permselective separation of an organic solution containing
 a. a metal-organo complex containing a metal selected from the group consisting of Ni, Pd, Pt, Co, Rh, Ru and B, and
 b. at least one organic hydrocarbon derivative having at least one nitrile group and up to 12 carbon atoms, which consists essentially in contacting one surface of an asymmetric perm-selective membrane with said organic solution under pressure and
recovering from the other side of the membrane fluid which has passed through the membrane, the said membrane consisting essentially of an aromatic polymer having recurring groups in the polymer chain.

The organic hydrocarbon compound having at least one nitrile group and up to 12 carbon atoms encompasses saturated, ethylenically unsaturated and aromatically unsaturated mononitriles and dinitriles. Exemplary nitriles which may be mentioned are acetonitrile, propionitrile, β-chloropropionitrile, adiponitrile, dodecanedinitrile, acrylonitrile, 3-pentenenitrile, 4-pentenenitrile 2-methylbutenenitrile, the isomeric dicyanobutenes, mucononitrile, benzonitrile and the like.

It is preferred to use solutions in which the nitrile is present to the extent of at least about 3 percent by weight of the organic solution. As indicated by the previously cited hydrocyanation patents, the nitriles present in the organic solution are the products of nitrile-forming reactions, as well as nitriles which are reactants or intermediates to be recycled in the process. The organic solutions may be comprised principally of the liquid nitriles alone or include solvents and inert diluents such as aromatic hydrocarbons, aliphatic or alicyclic hydrocarbons, esters, ketones, amides, etc., which do not attack the membrane. Such solvents are generally completely permeated through the membranes. In other cases ligand molecules such as triarylphosphites may be present in substantial excess over that found in the metal complex.

The metal-organo catalyst may be of any degree of complexity and contains one or more of the metals Ni, Pd, Pt, Co, Rh, Ru, and B. Preferred are compounds having the following formulas:

A. $MA^1A^2A^3A^4$ in which
 M is Ni, Pd, or Pt, and the

A's alike or different, are neutral ligands such as CO, NO, PR$_3$, P(OR)$_3$, AsR$_3$, SbR$_3$, a nitrile or an olefin (which occupies two A positions), in which R is alkyl or aryl of up to 18 carbon atoms, preferably lower alkyl, phenyl or tolyl;

B. (Z$_3^1$M$^1$)$_3$M$^2$X$^1$, in which

M$^2$ is Co or Rh,

X$^1$ is H, Cl, Br, I or CN,

Z$_3^1$M$^1$ is a neutral ligand in which

M$^1$ is P, As or Sb, and

Z$^1$ is R or OR;

C. RuX$_m^2$L$_n$, in which

X$^2$ is Cl, Br, I or a carboxylate,

L is a saturated mononitrile, a monounsaturated mononitrile, an amine, water, an alcohol of two to eight carbon atoms or an aromatic mononitrile, $m$ is 2 or 3, $n$ is 0 to 4;

D. HNi(PY$^1$Z$^2$)$_n$X$^3$, in which

Z$^2$ is R' or OR', in which —

R' is hydrocarbyl of up to 18 carbon atoms or such hydrocarbyl substituted with —Cl, —O—, or —CN, Y$^1$ is 2Z$^2$'s or —R$^2$—, or —O—R$_2$—O—, R$^2$ being a hydrocarbylene radical of up to 18 carbon atoms, X$^3$ is the anion of a protonic acid, and $n$ is 3 or 4;

E. PdX$_2^3$, in which

X$^3$ is the anion of a protonic acid, particularly halide; and

F. BR$_3^3$, in which

R$^3$ is a hydrocarbyl of six or more carbon atoms.

The semipermeable membranes employed in the present process are asymmetric structures of aromatic polymers. By asymmetric structure is meant a polymeric composition in which one surface consists of an extremely thin, dense skin on a thicker, porous layer of the same polymeric composition. Structures of this type and certain methods for their preparation are known. In macroscopic form the membranes may have various shapes such as films, tubes, or hollow fibers. It is preferred to impress the feed solution against the skin surface of the membrane.

The term aromatic polymer having recurring groups in the polymer chain is meant to include those polymers having aromatic groups connected by amide —C(O)—N—, imide —C(O)—N—C(O)—, hydrazide —C(O)—N—N—, acyl hydrazide —C(O)—N—N—C(O)—, semicarbazide —N—C(O)—N—N— and urea —N—C(O)—N— linkages.

The preferred membranes have amide, imide or hydrazide linkages joining aromatic groups. Especially preferred are the aromatic polyamide hydrazides which are described in the said Richter and Hoehn patent, and the insoluble aromatic polyimides disclosed in commonly assigned Alegranti patent application Ser. No. 273,805 filed on even date herewith.

The preferred polyimide membranes shown in the Alegranti application consist essentially of a polyimide having the repeating formula wherein R$^4$ is a tetravalent radical selected from the group R$^5$ is phenylene, tolylene, napthalene, biphenylene, anthrylene, pyridinediyl, and in which R$^6$ is oxygen, sulfur and methylene.

In the formulas, R$^4$ and R$^5$ are, respectively, tetravalent and divalent aromatic radicals. In R$^4$, each pair of bonds preferably stems from adjacent carbon atoms which are in a ring of aromatic character. Preferred compounds are those containing benzenoid rings. These formulas embrace individual polyimides in which R$^4$, R$^5$ and R$^6$ may be alike or different. In the copolyimides, the arrangements of units can be alternating, random or block as these terms are commonly understood in the art. Of these, the random copolymers are preferred.

These preferred asymmetric polyimide membranes can be obtained by subjecting a precursor polyamic acid solution to the action of a cyclizing agent wherein a selected relationship is observed among the components of the chemical cyclizing composition and the polyamic acid solution. When such relationship is employed, both cyclization to a polyimide and the formation of an asymmetric membrane are obtained.

Asymmetric polyimide membranes are obtained, as disclosed in the said Alegranti application, when an aromatic polyamic acid having essentially the unit formula

I.

is dissolved in an organic solvent A and fashioned into a membrane such as a film, tube, fiber, or hollow fiber, which is then immersed in a selected dehydrating or cyclizing solution comprising a carboxylic acid anhydride and a tertiary amine, with or without an organic solvent B. There is thus formed a polyimide having essentially the unit formula

II.

The selected relationship is as follows:
1. When the tertiary amine is a nonsolvent (e.g., a precipitant) for the polyamic acid, solvent B can be present or absent; miscible or immiscible with solvent A; and be a solvent or nonsolvent for the polyamic acid. The tertiary amine should be miscible with solvent A.
2. When the tertiary amine is a solvent for the polyamic acid (e.g., a nonprecipitant), solvent B should be present, should be a nonsolvent for the polyamic acid and should be miscible with solvent A.

The asymmetric structure is retained on removal of solvent and is usually indicated by optical opacity which appears to be associated primarily with the less dense portion of the structure. The contact time between the polyamic acid solution and the cylizing composition should be long enough and a temperature high enough to ensure practically complete cyclization to the polyimide. Following cyclization the polyimide is washed to remove solvents and unreacted materials, if any. The solvent content of the polyamic acid solution generally imparts to the solution a rather thick dope-like consistency. It is possible to use a small excess of solvent in preparing the solution and then to evaporate such excess by judicious use of heat to obtain a solution of good consistency. However, excessive heating or drying prior to contact with the cyclizing solution will not result in the formation of an opaque asymmetric polyimide structure. It should be kept in mind that when the components are properly selected as taught and undue heating or drying is avoided prior to contact with the cyclizing solution, the formation of the desired asymmetric structure will be evidenced by its opacity. Improperly selected components or undue heating will result in the formation of undesired symmetrical structure as evidenced by its clear transparent appearance. This opacity test can thus serve as a guide in obtaining the desired structures.

The membranes used herein are superior to prior art membranes in being durable, mechanically integral structures which need not be stored under water, and which achieve better separation of chemical species, as, for example, in the speed in accomplishing the separation. They are particularly useful in applications involving the separation of organometallic species from an organic nitrile.

The following terms have the meanings set forth. "Insoluble" means the polyimide does not dissolve more than 10 percent by weight at 25°C in a commonly used organic solvent such as N,N-dimethylacetamide, formamide, dimethylsulfoxide, tetramethylurea, and the like. Solvent" means the liquid in question dissolves more than 10 percent by weight at 25° C of the polyamic acid and "nonsolvent" means it dissolves less than 10 percent.

These preferred polyimides are characterized by being able to scatter small angle X-rays, as more fully set out in the Alegranti application.

The precursor polyamic acid is prepared according to known art by reacting at least one tetracarboxylic acid dianhydride with at least one organic diamine in an organic solvent for at least one of the reactants, the solvent being inert to the reactants, preferably under anhydrous conditions for a time and at a temperature below 175°C sufficient to form $n$ moles of polyamic acid each mole containing $m$ amide acid linkages. The polyamic acid is then converted to the polyimide by treating it with $n$ times $m$ moles of a carboxylic acid anhydride in the presence of a tertiary amine. The ratio of the amine to the anhydride can vary from about zero to infinity with 1:1 mixtures being most commonly used.

The degree of polymerization of the polyamic acid is subject to deliberate control. The use of equal molar amounts of the reactants under the prescribed conditions provides polyamic acids of very high molecular weight. The use of either reactant in large excess limits the extent of polymerization. However, the scope of the process encompasses the use of up to 5 percent excess of either the diamine or the dianhydride. More than 5 percent excess of either reactant results in an undesirably low molecular weight polyamic acid. For some purposes, it is desirable to use 1-3 percent excess of either reactant, preferably the dianhydride. Besides using an excess of one reactant to limit the molecular weight of the polyamic acid, a chain terminating agent such as phthalic anhydride may be used to "cap" the ends or the polymer chains.

In the preparation of the polyamic acid intermediate, it is important that the molecular weight be such that the inherent viscosity of the polymer is at least 0.1, preferably 0.3-5.0. The inherent viscosity is measured at 30°C, at a concentration of 0.5 percent by weight of the polymer in a suitable solvent, e.g., N,N'-dimethylacetamide. To calculate inherent viscosity, the viscosity of the polymer solution is measured relative to that of the solvent alone.

Inherent viscosity
$$= \frac{\text{natural logarithm } \frac{\text{viscosity of solution}}{\text{viscosity of solvent}}}{C}$$

where C is in the concentration expressed in grams of polymer per 100 milliliters of solution. As known in the polymer art, inherent viscosity is directly related to the molecular weight of the polymer.

The tetracarboxylic acid dianhydrides are characterized by the formula wherein R⁴ is a tetravalent radical as previously set forth.

When the dianhydrides shown in Table I below are used in the preparation of the polyimides of this invention, the radical R⁴ is as indicated.

TABLE I

| | Dianhydrides | R⁴ |
|---|---|---|
| 1 | Pyromellitic dianhydride. |  |
| 2 | 3,4,3',4'-benzophenone-tetracarboxylic dianhydride. |  |
| 3 | Pyrazinetetracarboxylic dianhydride. |  |
| 4 | 2,3,6,7-naphthalene-tetracarboxylic dianhydride. |  |
| 5 | 3,4,9,10-perylenetetra-carboxylic dianhydride. |  |
| 6 | 1,4,5,8-naphthalenetetra-carboxylic dianhydride. |  |
| 7 | 2,3,4,5-thiophenetetra-carboxylic dianhydride. |  |

The organic diamines are characterized by the formula $$H_2N - R^5 - NH_2$$

wherein R⁵ is as set out above.

when the diamines shown in Table II below are used in the preparation of the polyimides of this invention, the radical R⁵ is as indicated.

TABLE II

| | Diamine | R⁵ |
|---|---|---|
| 1 | 4,4'-diaminodiphenyl ether. |  |
| 2 | Lithium 2,4-diaminobenzene sulfonate. |  |
| 3 | m-Phenylenediamine. |  |
| 4 | p-Phenylenediamine. |  |
| 5 | 4,4'-diaminodiphenyl-propane. |  |
| 6 | 2,4-diaminotoluene. |  |
| 7 | 4,4'-diaminodiphenyl-methane. |  |
| 8 | 4,4'-diaminodiphenyl sulfide. |  |
| 9 | 2,6-diaminopyridine. |  |
| 10 | Benzidine. |  |
| 11 | 1,5-diaminonaphthalene. |  |

Organic solvent A suitable for carrying out the reaction of one or more tetracarboxylic dianhydrides as shown in Table I with one or more diamines as shown in Table II must be substantially inert to the reactants and must be a solvent, i.e., capable of dissolving 10 percent or more by weight of at least one of the reactants and the resulting polyamic acid. preferably the solvent dissolves all of the reactants. Stated in somewhat different language, the solvent is an organic liquid other than the reactants or homologs of the reactants and can contain functional groups other than the functional groups of the reactants. The normally liquid organic solvents of the N,N-dialkylcarboxamide class are useful. Preferred are the N,N-di(lower alkyl)amides of lower alkyl carboxylic acids and particularly N,N-dimethylformamide and N,N-dimethylacetamide. One or more of the solvents can be used. Representative solvents include:

N,N-Dimethylformamide
N,N-Dimethylacetamide
N,N-Diethylformamide
N,N-Diethylacetamide
Formamide
N-Methylformamide N-Methylcaprolactam
Dimethylsulfoxide
N-Methyl-2-pyrrolidone
Tetramethylurea
Dimethylsulfone
Butyrolactone The carboxylic acid anhydride which is considered to be the active dehydrating agent in the cyclizing bath is a lower aliphatic monobasic acid anhydride. This includes acetic anhydride, propionic anhydride, butyric anhydride, valeric anhydride, hexanoic anhydride, and the like, ether singly or mixtures of them. They can also be employed in admixture with anhydrides of aromatic monocarboxylic acids such as benzoic acid anhydride, napthoic acid anhydride, etc. The carboxylic acid anhydride is used in at least a stoichiometric equivalent based on the polyamic acid.

The tertiary amine, which is an aliphatic or aromatic amine or mixtures thereof, can be either a solvent or nonsolvent for the polyamic acid. Tertiary amines which are solvents for the polyamic acids include pyridine and 3,5-lutidine, among others. Tertiary amines which are non-solvents include:

Trimethylamine
Triethylamine
N,N-Dimethyldodecylamine
N,N-Dimethylbenzylamine

N,N-Dimethycyclohexylamine
4-Benzylpyridine
2,4,6-Collidine

Organic solvent B can be miscible or nonmiscible with solvent A and a solvent or nonsolvent for the polyamic acid. The latter are preferred. Those which are miscible with solvent A and nonsolvent for the polyamic acid are an aromatic hydrocarbon, chlorinated aliphatic hydrocarbon and aliphatic nitrile or mixtures thereof. Representative are:

| | |
|---|---|
| Benzene | Trichloroethylene |
| Toluene | Tetrachloroethane |
| Tetrachloroethylene | Adiponitrile |

Those which are nonmiscible with solvent A are one or more cyclic or acyclic aliphatic hydrocarbons having up to seven carbon atoms such as cyclohexane and n-heptane, etc.

It is possible to control the permeability properties by incorporating additives into the polyamic acid solution. A wide variety of additives may be used, particularly organic and inorganic salts. The only requiurement for operability is that the additive be soluble in the polyamic acid solution. The amount of additive employed can be varied widely and concentrations from 0.1% to about 30% of the weight of the polyamic acid are preferred. Typical salts that are useful are LiCl, AgOOCCF$_3$, and cetyl pyridinium bromide.

In general, permeators for separating fluid mixtures comprise, in combination, a fluid tight housing defining an enclosed fluid separation zone, at least one permselective membrane in said housing, support means co-operating with said housing and each said membrane to support said membrane in operative relationship in said separation zone, inlet means cooperating with said housing for directing a feed fluid at a given pressure against one surface of said membrane, and exit means cooperating with said housing for collecting and removing a permeated fluid at a lower pressure from another surface of said membrane.

Figure 1:
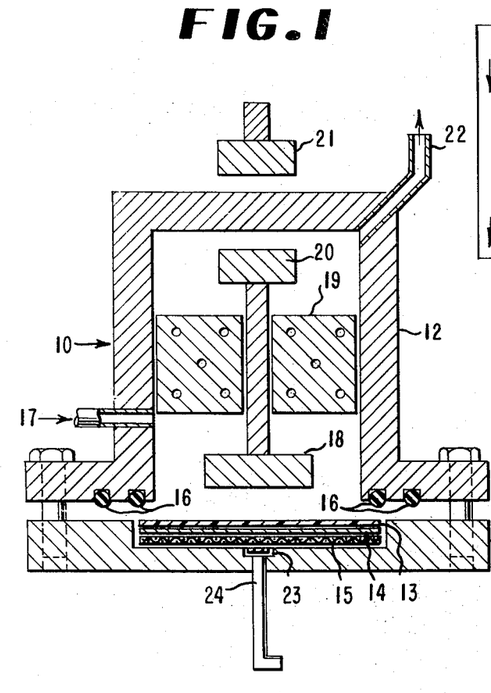

FIG. 1 is a representation of a permeator apparatus 10 which may be used in the practice of the invention. Base section 11 and upper section 12 are machined from blocks of corrosion resistant metal. Film 13, the reverse osmosis membrane, is a disc mounted on a layer of filter paper 14 against a stainless steel wire screen or mesh 15. When upper section 12 of the cell is bolted to lower section 11, synthetic elastomer O-rings 16 seat firmly around the periphery of the membrane and against the metal. Inlet 17 for feeding fluid into the cell in near the membrane. The fluid is agitated by a magnetically driven stirrer blade 18, positioned by support 19 and controlled by external and internal magnets 20 and 21 to ensure contact of fresh fluid with the membrane surface at all times. Bypass of a portion of the feed fluid is provided through exit 22. Fluid passing through membrane 13 passes through metal frit 23 and into exit pipe 24 and collected. The rejected solution is collected separately or recycled.

Figure 2:
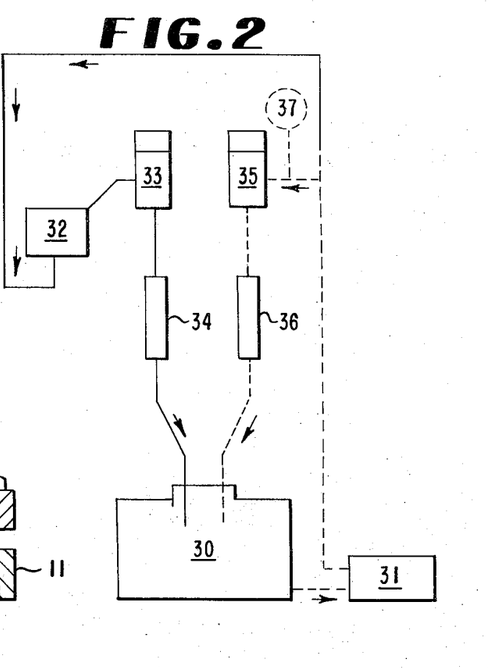

FIG. 2 shows a pumping system for providing circulation of feed fluid and maintenance of pressure inside the permeator. Fluid is circulated from reservoir 30 by pump 31 through permeator 32, which can be the permeator of FIG. 1, through pressure regulator 33, flow meter 34, and back to reservoir 30. Regulator 35 and flow meter 36 permit excess fluid from pump 31 to by-pass permeator 32 and return to the reservoir. Pressure is monitored by gauge 37. Conventional piping is, of course, supplied to connect the units of the control system as indicated.

Figure 3:
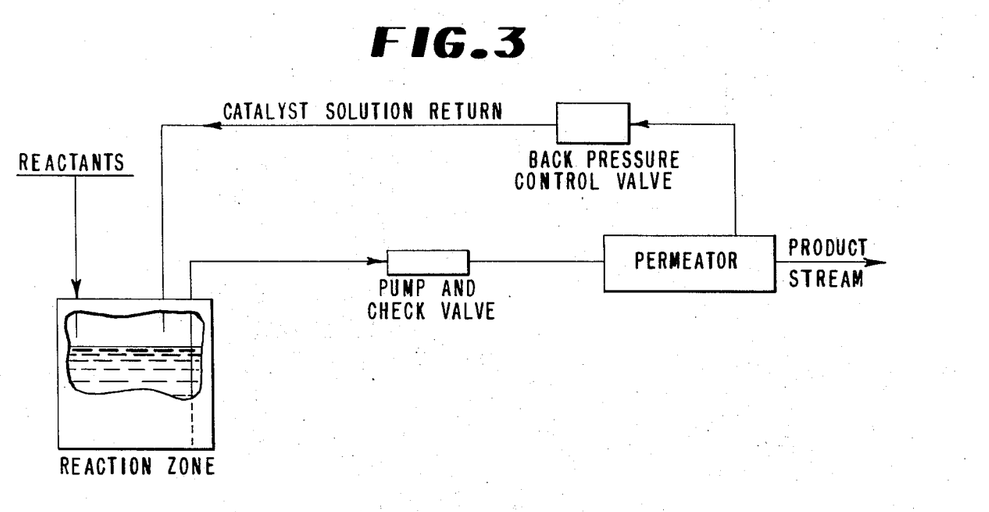

The process of this invention can also be adapted to a continuous liquid catalytic process as shown in the flow sheet of FIG. 3. Here a portion of the reaction mixture is continuously pumped to the permeator where product nitriles, some of the solvent and other solutes are removed and the remaining concentrated catalyst solution is returned to the reaction zone along with fresh quantities of the reactants.

When the amounts of feed liquid available is limited, the process may be carried out by mounting the permeator of FIG. 1 with the membrane at the bottom, placing the feed liquid on the membrane and pressuring the space above it with an inert gas such as nitrogen. This can be done by closing off passageway 17 after the feed fluid has been admitted, and then supplying the gas from a source through an appropriate valve (not shown) at passageway 22. Further, the feed liquid may be pressurized by a reactant gas such as hydrogen or ethylene, for example. Where suspended matter is present, it is desirable to first clarify the feed liquid by filtering to avoid plugging of the membrane.

In one aspect the invention is an improvement in the method of preparing organic nitriles having up to 12 carbon atoms comprising the step of permeating a nitrile solution through a membrane to reduce the concentration of soluble metal organic catalysts. Among the species of nitrile preparations are:

a. the hydrocyanation of olefins and unsaturated nitriles as shown in U.S. Pat. No. 3,579,560;

b. the dimerization and hydrodimerization of acrylonitrile as shown in Canadian Pat. No. 819,416;

c. the isomerization of pentenenitriles as shown in U.S. Pat. No. 3,538,142;

d. the hydrogenation of unsaturated nitriles such as dicyanobutene to form adiponitrile; and e. the coupling of ethylene and acrylonitrile as shown in U.S. Pat. No. 3,595,901.

The conditions of temperature and pressure may be selected in keeping with the particular species of nitrile process. In general the rate of permeation (GFD — gallons per sq. ft. of membrane surface per 24 hours) increases with an increase in temperature of pressure. Both the aromatic character and the linkages in the polymer chain of the applicable membranes contribute to their utility over a broad range of temperature and pressure. Thus, temperature of 110° and higher, and pressures as high as 2,500 psi may be employed.

SPECIFIC EMBODIMENTS OF THE INVENTION

In the illustrative examples below all parts and percentages are by weight unless otherwise stated.

EXAMPLE 1

Part A

An asymmetric polyimide membrane was prepared starting from a 20 percent solids solution of the polyamic acid from pyromellitic dianhydride and 4,4°-diaminodiphenyl ether in dimethylacetamide, prepared by the method of W. R. Sorenson and T. W. Campbell, "Preparative Methods of Polymer Chemistry," 2nd

Ed., Interscience Publishers, 1968, pp. 170–1. This solution was diluted to 10 percent polyamic acid by addition of anhydrous dimethylacetamide, and 10 percent (by weight of polyamic acid) of cetylpyridinium bromide was dissolved therein, A 15-mil film of this solution was cast on a glass plate under a doctor knife. The assembly was immersed in a bath containing 1 molar acetic anhydride and 1 molar triethylamine dissolved in benzene. The bath was then heated at about 60°–75° C for 15 minutes. The assembly was then washed successively at room temperature in benzene, ethanol containing 2 percent benzene, and water. The membrane was separated from the glass plate in the water bath and was air-dried. It was yellow, opaque, shiny on the side away from the glass, dull on the side against the glass. In cross-section the membrane was asymmetric, having a thin, dense "skin" on the shiny side.

Part B

In the apparatus of FIG. 1 a membrane as described above was mounted in the permeator with the skin side toward the feed solution. The feed solution contained 0.5 g of $[(C_6H_5)_3P]_3RhCl$ in 230 ml of adiponitrile. Reverse osmosis was conducted at 450 psi pressure for 70 hours to obtain a 2.7-ml sample of permeate. Colorimetric analysis showed an 85 percent rejection of the complex rhodium catalyst by the membrane, i.e., the catalyst concentration in the permeate was only 15 percent that in the feed solution.

EXAMPLE 2

In the permeator of FIG. 1 an asymmetric polyimide membrane, prepared as in Example 1, was mounted in the permeator with the skin side toward the feed solution. The feed solution contained 5 ml of a 49.5 percent solution of $L_4Ni$ in L, where L is the mixed cresyl phosphite 250 ml of adiponitrile and 50 ml of toluene. The feed solution was filtered under nitrogen prior to injection into the nitrogen-swept reservoir. Reverse osmosis was carried out at 55 psi to produce a flow rate of 0.99 GFD through the membrane. X-ray fluorescence analysis showed an 84 percent rejection of the nickel catalyst.

EXAMPLE 3

An asymmetric polyimide membrane was prepared using the method of Example 1, Part A, except that the cetylpyridinium bromide was replaced by an equal weight of silver trifluoroacetate, $AGOOCF_3$ and the final wash was methylene chloride instead of water. This membrane was mounted in the permeator of FIG. 1 with the skin side toward the feed solution. The feed solution contained 5 ml of the $L_4Ni$ in L solution of Example 2, 250 ml of 3-pentenenitrile and 50 ml of toluene. Reverse osmosis was carried out at 20 psi to produce a flow rate of 4.5 GFD through the membrane. X-ray fluorescence analysis showed an 81 percent rejection of the nickel catalyst by the membrane.

EXAMPLE 4

The procedure of Example 3 was repeated except that a pressure of 480 psi was used, giving a flow rate of 87 GFD through the membrane. X-ray fluorescence analysis showed a 93 percent rejection of the nickel catalyst by the membrane.

EXAMPLE 5

A mixture of 215 g of the $L_4Ni$ in L solution of Example 2, 41 g of adiponitrile and 6 g of 3-pentenenitrile was subjected to reverse osmosis at room temperature against the skin face of a membrane prepared as in Example 3 above, using 440 psi pressure, which gave a flow rate of 0.16 GFD. X-ray fluorescence analysis showed an 88 percent rejection of the nickel catalyst by the membrane. Gas chromatographic analysis showed that the adiponitrile and 3-pentenenitrile concentrations were more than twice as great in the permeate as in the feed mixture.

EXAMPLE 6

The procedure of Example 5 was repeated with the exceptions that the operation was conducted at 69° C, and the pressure was 300 psi, giving a flow rate of 1.6 GFD. X-ray fluorescence analysis showed an 89 percent rejection of the nickel catalyst by the membrane. The nitrile concentrations in the permeate were double those in the feed.

EXAMPLE 7

The procedure of Example 6 was repeated with the exception that the operation was conducted at 105° C, giving a flow rate of 3.7 GFD. X-ray fluorescence analysis showed an 80 percent rejection of the nickel catalyst by the membrane and the nitrile concentrations in the permeate were 70 percent greater than those in the feed.

EXAMPLE 8

A mixture of 215 g of the $L_4Ni$ in L solution of Example 2, 41 g of adiponitrile, 12 g of 3-pentenenitrile and 15 g of $Al(acetylacetonate)Cl_2$ was subjected to reverse osmosis against the skin face of a membrane, prepared as in Example 3. A pressure of 500 psi and operating at 77° C., gave a flow rate of 2.0 GFD. There was an 85 percent rejection of the nickel catalyst by the membrane and the adiponitrile content of the permeate was double that of the feed. The aluminum salt passed through the membrane unimpeded.

EXAMPLE 9

An asymmetric polyimide membrane was prepared using the procedure of Example 1, Part A, except that silver perfluorobutyrate, $AgOOCCF_2CF_2CF_3$, was used in place of the same weight of cetylpyridinium bromide and tetrachloroethylene rather than benzene was used as cyclizing solvent.

With this membrane in the apparatus of FIG. 1, a mixture of 650 ml of tetrahydrofuran, 12 g of $ZnCl_2$, 100 ml of the 49.5% $L_4Ni$ in L solution of Example 2 and 40 ml of adiponitrile was subjected to reverse osmosis. The pressure was 650 psi, giving a flow rate of 0.83 GFD. Analysis of the permeated liquid showed the following concentrations relative to the feed solution:

| | |
|---|---|
| Ni | 0.6% |
| Zn | 117.0% |

EXAMPLE 10

A membrane was prepared from the same casting solution used in Example 1, Part A. A 20-mil film of this solution was cast under a doctor knife on a glass plate that had previously been wiped with a dispersion of a fluorocarbon telomer in a volatile hydrocarbon fluid (Slipsray). The assembly was left in air for 1 minute and then was immersed in a cyclizing bath of 95 ml acetic anhydride and 140 ml triethylamine dissolved in 500 ml benzene. The bath was held at room temperature for 15 minutes and then heated at about 60°–75° C for 15 minutes. The assembly was first washed benzene and then in ethanol containing 2 percent benzene. In this latter wash the membrane was detached from the glass. It was washed in water and dried in air. An opaque, yellow, asymmetric polyimide membrane was obtained.

The feed solution, carefully protected from contact with air, consisted of 10 percent by weight of triphenylboron in 1:1 adiponitrile:3-pentenenitrile. Under a pressure of 1,600 psi it was permeated through the membrane above in the apparatus of FIG. 1 at the rate of 1.8 GFD. The IR and NMR spectra measured in sealed sample containers showed a 70 percent decrease in the triphenylboron content of the permeated liquid.

The next four examples use polyamides such as those disclosed in the Richter and Hoehn patent.

EXAMPLE 11

A casting solution was prepared by dissolving 15 parts by weight of a dried polymer formed from metaphenyl lenediamine and isophthaloyl chloride in 85 parts by dimethyl-acetamide, 3 parts of magnesium chloride, and 4.5 parts of polyethylene glycol 1,000. A 0.025-inch thick film was spread on a room temperature glass plate. The coated plate was warmed to about 35° C with a heat lamp in still air for 5 minutes. The plate was then immersed in 40° C water, washed with water and freeze-dried to yield an asymmetric, microporous membrane of an aromatic polyamide. After storage in mineral oil, it was washed with benzene, soaked in adiponitrile, with the excess being blotted away before mounting in the permeator of FIG. 1.

Using the same feed solution as in Example 10, and a pressure of 1,400 psi, the permeation rate was 4.2 GFD with a 30 percent decrease in the triphenylboron content of the liquid.

EXAMPLE 12

Using a similar asymmetric membrane from the same aromatic polyamide used in Example 11, permeation at 1,200 psi pressure was carried out on a solution containing 60 ml of the catalyst solution used in Example 2 ($NiL_4$ in L), 350 ml of toluene and 50 ml of adiponitrile. The permeation rate was 25 GFD and the permeated liquid showed much reduced nickel content by qualitative test.

EXAMPLE 13

A polymer was prepared by condensation of a mixture of 80 parts of 3-aminobenzyhydrazide and 20 parts of 4-aminobenzhydrazide and a stoichiometrically equivalent amount of a mixture of 70 parts of isophthaloyl chloride and 30 parts of terephthaloyl choride in dimethylacetamide solution. This polymer was isolated by pouring the condensation mass into ice water, washing free of acid, and drying. Typical polymer preparations had inherent viscosities near 1.1 as measured with a solution containing 0.5 weight percent polymer in dimethylacetamide at 25° C.

A solution was prepared from 15 parts polymer and 85 parts of dimethylacetamide by weight and 4.5 parts lithium nitrate, 6 parts of 2,11-diacetyl-2,11-diaza-5,8-dioxado-decane, and 3.0 parts of calcium chloride were added. A 0.025-inch film of the solution was spread on a room temperature glass plate. The coated plate was warmed to about 35° C. in still air with a heat lamp. It was then immersed in 60° C. water, washed with water, and freeze-dried.

Using the same feed solution as Example 12 under a pressure of 1,500 psi, the permeation rate through this asymmetric polyamide hydrazide membrane was 0.7 GFD with good nickel rejection by qualitative test.

EXAMPLE 14

Using the same membrane as in Example 13, the feed liquid of Example 10 was permeated at 1,400 psi pressure at the rate of 5.5 GFD with a 70 percent rejection of triphenylboron.

EXAMPLE 15

An asymmetric polyimide membrane was prepared by a procedure identical to that used in Example 10. The feed liquid consisted of a solution that, except for the lack of HCN, is active for hydrocyanation of pentenenitriles to adiponitrile. It was a mixture of 0.50 g of $HCo[P(OC_6H_5)_3]4$, 0.05 g of $FeCl_3$, 25 ml of 3-pentenenitrile, and 5 ml of adiponitrile. This was stirred under nitrogen at 100° C. for 2 hours. After cooling, the clear solution was filtered and permeated at 1,600 psi pressure, giving a flow rate of 8 GFD. There was a 78 percent rejection of the cobalt catalyst by the membrane.

EXAMPLE 16

An asymmetric polyimide membrane was prepared using the procedure of Example 1, except that the cetylpyridinium bromide was replaced by an equal weight of ethylpyridinium bromide. The membrane was used in a process for hydrogenation of dicyanobutene to adiponitrile.

Part A

A nitrogen purged autoclave was loaded with 200 g of dicyanobutene, 2 g of $[(C_6H_5)_3P]_3RhCl$ and 4 g of sodium carbonate. The autoclave was then heated to 60°C and pressured to 100 atmospheres with hydrogen. In 2 hours the hydrogen pressure stopped dropping. The temperature and pressure were maintained for an additional 4 hours. The reaction mixture was recovered without exposure to air. Gas chromatographic analysis showed that the hydrogenation to adiponitrile was complete. The mixture was filtered to remove sodium carbonate.

Part B

The solution from Part A, along wiith 40 ml of nitrogen-sparged adiponitrile, was placed in the apparatus of FIG. 1 and subjected to reverse osmosis against the polyimide membrane. The operation was conducted first at 450 psi, giving a flow rate of 1.3 GFD. There was an 88 percent rejection of the rhodium catalyst by the membrane under these conditions. The operation was then conducted at 50 psi, giving a flow rate of 0.12 GFD. There was a 92 percent rejection of the rhodium catalyst by the membrane.

Part C

A 20-ml sample of the feed solution enriched in catalyst from Part B was withdrawn from the permeation apparatus and placed in a nitrogen-filled autoclave with 20 ml of dicyanobutene and 1.5 g of sodium carbonate. The apparatus was heated to 60°C. and pressured with 100 atmospheres of hydrogen. In 2 hours the pressure had stopped dropping and remained constant through an additional two hours at 80°C. Gas chromatographic analysis showed that hydrogenation to adiponitrile was complete.

EXAMPLE 17

Part A

An autoclave was loaded with 4.2 g of ruthenium trichloride trihydrate (37% Ru), 7.6 g of sodium salicylate, 100 ml of acrylonitrile and 100 ml of benzonitrile. After a period of 3 hours at 155°C, the mixture was left at room temperature for several days. The dark liquid was then decanted from a substantial amount (13 g) of black sludge and filtered. Gas chromatographic analysis showed the composition (peak areas from a thermal conductivity detector) to be: acrylonitrile, 24%; propionitrile, 1.8%; benzonitrile, 56%; mucononitrile, 0.7%; dicyanobutene, 16.8%; adiponitrile, 0.2%.

Part B

The liquid product of part A along with 45 ml of additional adiponitrile was placed in the apparatus of FIG. 1 and subjected to reverse osmosis against a membrane of the type used in Example 16. The operation was conducted first at 25 psi, giving a flow rate of 0.2 GFD and a 96 percent rejection of the ruthenium catalyst by the membrane. The operation was then conducted at 100 psi, giving a flow rate of 0.98 GFD and a 99 percent rejection of the ruthenium catalyst by the membrane. At the end of this operation, analysis of the remaining feed solution and the permeate by vapor phase gas chromatography showed the following percentages:

|  | Feed | Permeate |
|---|---|---|
| Acrylonitrile | 16.4 | 16.4 |
| Propionitrile | 1.4 | 1.3 |
| Benzonitrile | 43.0 | 41.1 |
| Mucononitrile | 0.5 | 0.5 |
| Adiponitrile | 25.3 | 25.6 |
| Dicyanobutenes | 13.1 | 14.7 |

EXAMPLE 18

Part A

A solution of 1.0 ml of a solution of 0.68 g of $RuCl_3$ trihydrate in 5.0 ml of water, 6.0 ml of acrylonitrile, and 43 ml of hexamethylphosphoramide was heated for 2 hours under 30 psig hydrogen pressure. Vapor phase gas chromatographic analysis then indicated the nitriles in the sample to be in the following relative amounts: acrylonitrile, 5.3%, propionitrile, 40.7%; β-chloropropionitrile, 1.1%; dicyanobutenes, 34.6%; adiponitrile, 8.4%.

Part B

The solution from Part A was subjected to reverse osmosis against a membrane of the type used in Example 3. The operation was conducted at a pressure of 450 psi, giving a flow rate of 8.2 GFD. The ruthenium catalyst was substantially absent in the permeate.

EXAMPLE 19

A solution of 30 ml of dodecanedinitrile, 60 ml of toluene and 15 ml of the 49.5% $L_4Ni$ in L solution of Example 2 was subjected to reverse osmosis against a membrane like Example 18. The operation was conducted at 400 psi pressure, giving good rejection of the nickel catalyst by the membrane. The $C_{12}$ dinitrile passed through the membrane unimpeded.

EXAMPLE 20

Part A

Acrylonitrile (50 ml) was mixed with 2.0 g of $PdCl_2$ (60% Pd) and 1.6 g of LiCl. After heating at 120°C for 8 hours under an ethylene pressure of 600 psi, the mixture was shown to contain about 27% pentenenitriles, exclusive of butene content.

Part B

The liquid product from Part A was subjected to reverse osmosis. The membrane used was prepared by the procedure of Example 1, Part A, except that the ceptylpyridinuim bromide was replaced by an equal weight of $AgOOCCF_3$ and the polyamic acid film was soaked in the acetic anhydride/triethylamine cyclizing bath for 30 minutes at room temperature before heating the bath. The final wash was chloroform instead of water.

The permeation was conducted at 1,200 psi pressure, giving a flow rate of 155 GFD. there was a 30 percent rejection of the palladium catalyst by the membrane.

The embodiment of the invention in which an exclusive property or privilege is claimed are defined as follows:

1. A process for the permselective separation of an organic solution containing
   a. a metal-organo complex selected from the group consisting of
      A. $MA^1A^2A^3A^4$ in which
         M is Ni, Pd or Pt, and the
         A's alike or different, are neutral ligands
      B. $(Z^1_3M^1)_3M^2X^1$, in which
         $M^2$ is Co or Rh,
         $X^1$ is H, Cl, Br, I or CN,
         $Z^1_3M^1$ is a neutral ligand in which
            $M^1$ is P, As or Sb, and
            $Z^1$ is R or OR;
      C. $RuX^2_mL_n$, in which
         X is Cl, Br, I or a carboxylate,
         L is a saturated mononitrile, a monounsaturated mononitrile, an amine, water, an alcohol of two to eight carbon atoms or an aromatic mononitrile,
         m is 2 or 3,
         n is 0 to 4;
      D. $HNi(PY^1Z^2)_nX^3$, in which
         $Z^2$ is R' or OR', in which
            R' is hydrocarbyl of up to 18 carbon atoms or such hydrocarbyl substituted with —Cl, —O—, or —CN,
         $Y^1$ is $2Z^2$'s or $—R^2—$, or $—O—R^2—O—$,
            $R^2$ being a hydrocarbylene radical of up to 18 carbon atoms,
         $X^3$ is the anion of a protonic acid, and
         n is 3 or 4;
      E. $PdX^3_2$, in which
         $X^3$ is the anion of a protonic acid; and
      F. $BR^3_3$, in which
         $R^3$ is a hydrocarbyl of six or more carbon atoms, b. at least 3 percent of at least one organic hydrocarbon derivative having at least one nitrile group and up to 12 carbon atoms, which consists essentially in contacting one surface of an asymmetric permselective membrane consisting essentially of an aromatic polyimide prepared from pyromellitic dianhydride and 4,4'-diaminodiphenyl ether with said organic solution under pressure and recovering from the other side of the membrane fluid which has passed through the membrane.

2. A process according to claim 1 wherein the neutral ligand recited in subdivision (a) (A) is selected from the group consisting of CO, NO, $PR_3$, $P(OR)_3$, $AsR_3$, $SbR_3$, a nitrile and an olefin in which R is an alkyl or aryl of up to 18 carbon atoms and further wherein when the neutral ligand is an olefin, it occupies two A positions.

3. A process according to claim 2 wherein the solution contains acrylonitrile.

4. A process according to claim 2 wherein the solution contains adiponitrile.

5. A process according to claim 2 wherein the solution contains 3-pentenenitrile.

6. A process according to claim 2 wherein the solution contains a dicyanobutene.

7. A process according to claim 2 wherein the metal-organo complex contains Ni.

8. A process according to claim 2 wherein the metal-organo complex contains Pd.

9. A process according to claim 2 wherein the metal-organo complex contains Pt.

10. A process according to claim 2 wherein the metal-organo complex contains Rh.

11. A process according to claim 2 wherein the metal-organo complex contains B.

12. A process according to claim 2 wherein the metal-organo complex contains triphenylboron.

* * * * *

UNITED STATES PATENT OFFICE
CERTIFICATE OF CORRECTION

PATENT NO. : 3,853,754
DATED : December 10, 1974
INVENTOR(S) : Lawrence Wayne Gosser It is certified that error appears in the above-identified patent and that said Letters Patent are hereby corrected as shown below:

Column 3, line 6, "$Z_3^1$" should read --$Z^1_3$--.

Column 3, line 9, "$Z_3^1$" should read --$Z^1_3$--.

Column 3, line 12, "$X_m^2$" should read --$X^2_m$--.

Column 3, line 30, "$X_2^3$" should read --$X^3_2$--.

Column 3, line 34, "$R_3^3$" should read --$R^3_3$--.

Column 5, line 34, "and a" should read --and at a--.

Column 8, line 29, "preferably" should read --Preferably--.

Column 9, line 50, "cell in near" should read --cell is near--.

Column 10, line 64, "4,4°-" should read --4,4'- --.

Column 11, line 5, "," should read --.--.

Column 11, line 54, "AGOOCF$_3$" should read --AgOOCF$_3$--.

Column 13, line 7, "Slipsray" should read -- Slipspray--.

Column 13, line 33, "metaphenyl lenediamine" should read --metaphenylenediamine--.

Column 13, line 34, "by" should read --of--.

Column 16, line 31, "embodiment" should read --embodiments--.

Signed and Sealed this twenty-sixth Day of August 1975

[SEAL]

Attest:

RUTH C. MASON
Attesting Officer

C. MARSHALL DANN
Commissioner of Patents and Trademarks